United States Patent [19]

Zeller

[11] Patent Number: 4,708,709
[45] Date of Patent: Nov. 24, 1987

[54] METHOD AND APPARATUS FOR THE INFINITELY VARIABLE SETTING OF THE TAILS $U^{235}$ CONCENTRATION OF GAS CENTRIFUGE CASCADES FOR THE SEPARATION OF URANIUM ISOTOPES

[75] Inventor: Robert Zeller, Langerwehe, Fed. Rep. of Germany

[73] Assignee: Uranit GmbH, Jülich, Fed. Rep. of Germany

[21] Appl. No.: 621,367

[22] Filed: Jun. 15, 1984

[30] Foreign Application Priority Data

Jun. 18, 1983 [DE] Fed. Rep. of Germany ....... 3321823

[51] Int. Cl.$^4$ .......................... B04B 5/02; B04B 7/00
[52] U.S. Cl. ........................................ 494/32; 494/35; 494/37
[58] Field of Search ..................... 494/2, 5, 31, 32, 33, 494/34, 35, 37; 210/512.2; 423/2, 3

[56] References Cited

U.S. PATENT DOCUMENTS

| | | | |
|---|---|---|---|
| 1,412,738 | 4/1922 | Heller | 494/31 |
| 1,649,095 | 11/1927 | Brewster | 494/31 |
| 2,013,668 | 9/1935 | Peltzer | 494/35 |
| 2,524,816 | 10/1950 | Lyons | 494/31 |

FOREIGN PATENT DOCUMENTS 274687 10/1977 Fed. Rep. of Germany .
480943 3/1938 United Kingdom ................ 494/31

Primary Examiner—Robert W. Jenkins
Attorney, Agent, or Firm—Spencer & Frank

[57] ABSTRACT

A process and apparatus for infinitely variably setting the $U^{235}$ tails concentration in the operation of centrifuge cascades for the separation of the uranium isotopes in a gaseous uranium isotope mixture, comprising introducing a cascade feed comprising a mixture of gaseous uranium isotopes containing $U^{235}$ into a feed header of an intermediate stage, equalizing the pressure in the feed header of each stage to the pressure of the cascade feed, and maintaining a predetermined $U^{235}$ product concentration by manipulating a choke valve on product or tails streams from each stage, or a choke valve on the cascade feed stream to vary the ratio between the cascade feed and the cascade product stream to adjust the $U^{235}$ concentration and the tails. The apparatus comprises a multiplicity of centrifuge stages connected in series as a cascade wherein a product header from each stage is connected to a feed header of the next stage in the direction of enrichment and a tails header from each stage is connected to the feed header of the preceding stage, lines connecting feed headers of all stages together, and a cascade feed line, a product line from each stage, and a tail line from each stage having choke valves located therein.

8 Claims, 1 Drawing Figure

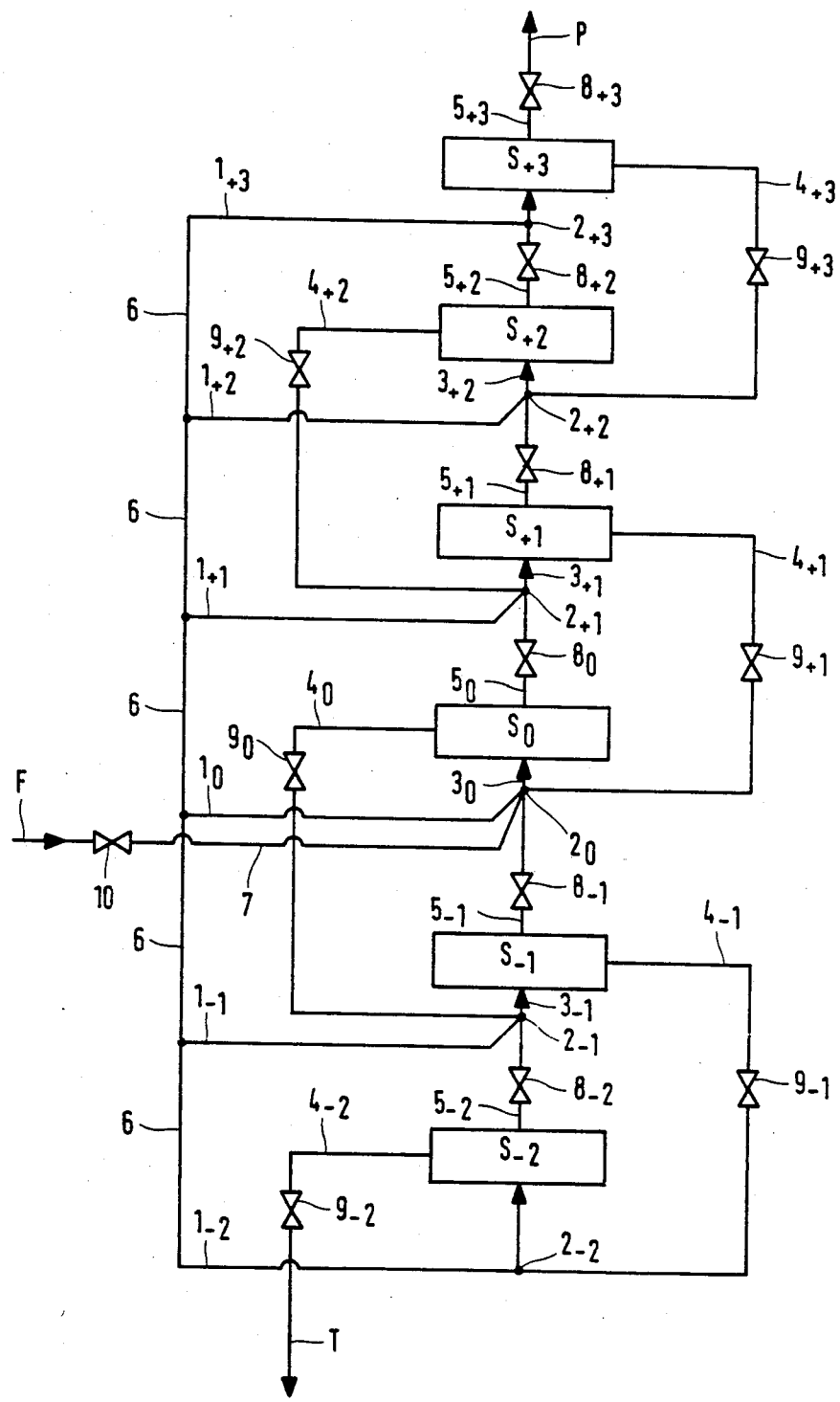

METHOD AND APPARATUS FOR THE INFINITELY VARIABLE SETTING OF THE TAILS $U^{235}$ CONCENTRATION OF GAS CENTRIFUGE CASCADES FOR THE SEPARATION OF URANIUM ISOTOPES

The present invention relates to a method for the infinitely variable setting of the tails concentration of $U^{235}$, with a constant $U^{235}$ product concentration, in the operation of centrifuge cascades for the separation of the uranium isotopes in a gaseous uranium isotope mixture, as well as to a cascade apparatus for implementing the method.

BACKGROUND OF THE INVENTION

In order to change the tails concentration in a centrifuge cascade of this type, it has been proposed in German Pat. No. 2,746,871 to feed a partial stream of the starting mixture ($UF_6$) to the first stage of the cascade and to charge the first cascade enrichment stage or the first cascade derichment stage, respectively, with the remaining starting mixture. Charging the first cascade enrichment stage results in a reduction of $U^{235}$ concentration in the tails, as compared to the tails concentration when the entire starting mixture is fed into the first stage. Charging the remaining partial stream to the first cascade derichment stage, conversely, results in an increase of $U^{235}$ in the tails.

According to this patent, it was possible, in principle, to infinitely vary the tails concentration. However, in addition to high mixture losses, it involved a less than optimum utilization of the individual stages.

SUMMARY OF THE INVENTION

It is the object of the present invention to improve a process and a cascade of this type so that the $U^{235}$ tails concentration can be infinitely varied without impairing the operation of individual centrifuges in the cascade and without noticeably reducing cascade efficiency, thereby maintaining a constant product $U^{235}$ concentration.

This object is achieved by providing valved interconnections between the feed headers, product headers and tails headers to each stage of the cascade, except for the product header of the final enrichment stage and the tails header of the final derichment stage which directly exit the cascade system. By these interconnections the pressure in the feed headers is always matched to the pressure of the starting feed, the concentration of $U^{235}$ in the tails can be increased by partially closing the valves on the product headers and increasing the starting feed flow rate, and the concentration of $U^{235}$ in the tails can be decreased by closing the valves on the tails headers and reducing the starting feed flow rate; thereby maintaining a constant $U^{235}$ concentration in the product stream under changing conditions.

BRIEF DESCRIPTION OF THE DRAWING

The drawing is a schematic representation of a six-stage centrifuge cascade interconnected to provide an infinitely variable adjustment of the tails concentration.

DESCRIPTION OF THE PREFERRED EMBODIMENTS

By choking the gas streams in the product headers of the individual cascade stages, a counterpressure is built up against the respective centrifuges which reduces the centrifuge cut, i.e. the ratio of product to feed of the centrifuge. Without further measures, this increases the $U^{235}$ concentration in the product stream of the cascade. By correspondingly increasing the cascade feed stream flow, however, the original product concentration is re-established. Because this does not significantly change the separating output of the individual centrifuges, but increases the total $UF_6$ throughput through the cascade, the $U^{235}$ concentration in the tails stream is increased. By manipulating the choke valves on the cascade feed, the product and the tails streams, the product $U^{235}$ concentration can be maintained constant, despite changes in feed flow and feed concentration.

Conversely, by choking the gas streams in the tails headers, a dynamic pressure is developed which results in an increase in the centrifuge cuts that would actually reduce the $U^{235}$ concentration in the product stream of the cascade. However, by reducing the cascade feed stream flow, the original product concentration at the head of the cascade is re-established. This again does not substantially change the separating output of the individual centrifuges but, since the total $UF_6$ throughput of the cascade is reduced, the $U^{235}$ concentration in the tails stream drops.

Because changes in the cuts as a result of the build-up of counterpressures at the product and tails headers would cause the cascade to become imbalanced, which could result in overloading particular centrifuges, the pressure is equalized in the feed headers in such a manner that the gas pressure in the feed headers is adjusted to equal the pressure of the starting mixture. Through a common ring conduit with which the feed headers of all cascade stages are connected, the pressure levels are equalized to such an extent that approximately the same load is present in all centrifuges of all cascade stages.

Although this leads to mixture losses between the cascade stages due to the equalization streams which flow in the ring conduit, the reduction of cascade efficiency resulting therefrom, i.e., the ratio of separating output of the cascade to the sum of the separating output of all centrifuges, remains within justifiable limits.

One embodiment of the invention will be described below with the aid of the drawing, a schematic representation of a six-stage centrifuge cascade with infinitely variable regulation of the tails concentration. The cascade comprises a first stage $S_0$, three enrichment stages $S_{+1}$, $S_{+2}$, $S_{+3}$, as well as two derichment stages $S_{-1}$, $S_{-2}$. The starting mixture F, normally gaseous $UF_6$ of a natural isotope composition, flows through common feed conduit 7 to connection point $2_0$. From there, the mixture flows through feed header $3_0$ to first stage $S_0$. The heavy fraction of the bottom stage $S_0$ is conducted through tails header $4_0$ to connection point $2_{-1}$ and from there through feed header $3_{-1}$ back to the first derichment stage $S_{-1}$. The light fraction of bottom stage $S_0$ is conducted through product header $5_0$ to feed header $3_{+1}$ and from there to the first enrichment stage $S_{+1}$. The remaining stages are connected together in a corresponding manner to form a cascade. The cascade is here designed so that at connection point $2_n$, fractions having as closely as possible the same isotope concentration are brought together. The lighter cascade fraction P is extracted as the cascade product stream from the uppermost enrichment stage $S_{+3}$; the heavy cascade fraction T is removed as the cascade tails stream from the lowermost derichment stage $S_{-2}$.

As can also be seen in the drawing figure, all feed headers $3_n$ are connected to a common ring conduit 6 by means of stub conduits $1_n$.

The index subscripts indicate the cascade stage to which the respective conduit or the respective valve is associated, i.e. e.g. $4_{+2}$=tails header of cascade stage $S_{+2}$.

Product headers $5_n$ as well as tails headers $4_n$ of the cascade stages are equipped with infinitely variable choke valves $8_n$ and $9_n$, the actuation of which permits variation of the centrifuge cut and thus also the ratio between product stream P and feed stream F.

Feed stream F is set by means of regulating valve 10 in conduit 7.

Table 1 below reflects the cascade efficiency upon increase and reduction, respectively, of the centrifuge cut by appropriate choking through valves $8_n$ and $9_n$, respectively, as well as the resulting $U^{235}$ concentrations in the tails stream T with a constant $U^{235}$ concentration of product stream P at about 3.5%:

TABLE 1

| Mode of Operation | Changes in Centrifuge Cuts | U235 Tails Concentration | Cascade Efficiency |
|---|---|---|---|
| Build up tails | +0.050 | 0.16% | 97.2% |
| Counterpressure | +0.025 | 0.19% | 98.7% |
| Unchoked | 0.000 | 0.21% | 99.6% |
| Build up product | −0.025 | 0.24% | 97.5% |
| Counterpressure | −0.050 | 0.27% | 94.8% |

Table 2 below reflects the cascade efficiency, the cascade cut—i.e. the ratio of the cascade product and feed streams—and the U235 concentration in the product and tails streams that can be achieved upon simultaneous variation of centrifuge cuts by apropriate choking of valves $8_n$ and $9_n$ and variation of the cascade feed stream. The U235 feed concentration was assumed as 0.711%. The amount of feed stream is given in arbitrary units, the actual feed depending on cascade size and centrifuge type. On variation of U235 feed concentration X(feed) the respective tails and product concentrations of the cascade will be the respective values of Table 2 multiplied by the factor X(feed)/0.711.

TABLE 2

| Mode of Operation | | Cascade Output | | | |
|---|---|---|---|---|---|
| Changes in Centrifuge Cuts | Cascade Feed (arbitr. units) | U235 Product Concentration (% U235) | U235 Tails Concentration (% U235) | Cascade Efficiency (%) | Cascade Cut |
| −0.050 | 1.090 | 3.8 | 0.26 | 93.4 | 0.130 |
|  | 1.200 | 3.5 | 0.27 | 94.8 | 0.136 |
|  | 1.300 | 3.4 | 0.28 | 96.2 | 0.141 |
|  | 1.500 | 3.1 | 0.29 | 98.5 | 0.151 |
| −0.025 | 0.870 | 4.1 | 0.21 | 93.6 | 0.128 |
|  | 1.000 | 3.7 | 0.23 | 96.0 | 0.138 |
|  | 1.090 | 3.5 | 0.24 | 97.5 | 0.144 |
|  | 1.200 | 3.3 | 0.25 | 99.1 | 0.151 |
|  | 1.300 | 3.1 | 0.26 | 98.8 | 0.157 |
| 0.000 | 0.748 | 4.2 | 0.18 | 94.6 | 0.131 |
|  | 0.870 | 3.8 | 0.18 | 97.3 | 0.138 |
|  | 1.000 | 3.5 | 0.21 | 99.6 | 0.156 |
|  | 1.090 | 3.2 | 0.23 | 98.2 | 0.160 |
|  | 1.200 | 3.0 | 0.25 | 96.2 | 0.167 |
| +0.025 | 0.748 | 3.9 | 0.17 | 97.9 | 0.146 |
|  | 0.870 | 3.5 | 0.19 | 98.7 | 0.158 |
|  | 1.000 | 3.2 | 0.21 | 95.6 | 0.169 |
|  | 1.090 | 3.0 | 0.23 | 93.5 | 0.176 |
| +0.050 | 0.691 | 3.8 | 0.15 | 98.8 | 0.155 |
|  | 0.748 | 3.6 | 0.16 | 97.2 | 0.157 |
|  | 0.870 | 3.2 | 0.19 | 93.9 | 0.174 |

The above embodiments are presented for the purpose of illustrating the invention. It will be understood that various modification, changes and adaptations are intended to be within the bounds of the invention, limited only by the terms of the claims set forth below.

I claim:

1. A process for concentrating $U^{235}$ in a mixture of gaseous uranium isotopes using a multiple stage centrifuge cascade having a feed, a product and a tails stream, in which each centrifuge stage has a feed, product and tails header; wherein the $U^{235}$ concentration in the tails stream is infinitely variable and a predetermined $U^{235}$ concentration in the product stream is maintained by adjusting the $U^{235}$ concentration in the tails stream according to the volume and $U^{235}$ concentration of the feed stream mixture of gaseous uranium isotopes; said multiple stage cascade having choke valves on the product and tails headers of each stage; wherein said multiple stage cascade is interconnected such that the product header of each preceeding stage is connected to the feed header of the next stage in the direction of $U^{235}$ enrichment, the tails header of each stage is connected to the feed header of the preceeding stage, and the feed headers of all stages are interconnected to equalize the pressures in all feed headers; comprising:
   (a) introducing the cascade feed, the mixture of gaseous uranium isotopes from which the $U^{235}$ is to be concentrated, into the feed header of an intermediate stage;
   (b) equalizing the pressure in the feed header of each stage to the pressure of the cascade feed in (a) above; and
   (c) maintaining the predetermined $U^{235}$ product concentration by manipulating the choke valves on the product or tails streams from each stage, or the choke valve on the cascade feed stream to vary the ratio between the cascade feed and the cascade product stream to adjust the $U^{235}$ concentration in the tails.

2. The process as recited in claim 1, wherein the tails stream $U^{235}$ concentration is increased by partially closing the choke valves on the product streams from each stage, while increasing the cascade feed stream flow.

3. The process as recited in claim 2, wherein the choke valves on the tails streams from each stage are opened in addition to or in place of the closing of the choke valves on the product streams.

4. The process as recited in claim 1, wherein the tails stream $U^{235}$ concentration is decreased by partially closing the choke valves on the tails streams from each stage, while reducing the cascade feed stream flow.

5. The process as recited in claim 4, the choke valves on the product streams from each stage are opened in addition to or in place of the closing of the choke valves on the tails streams.

6. The process as recited in claim 1, wherein the $U^{235}$ concentration in every stream connected to the feed header of a particular stage is about the same.

7. An apparatus for concentrating $U^{235}$ in a mixture of gaseous uranium isotopes wiht a multiple stage centrifuge cascade comprising a multiplicity of centrifuge stages connected in a series as a cascade, in which a product header from each stage is connected to a feed header of the next stage in the direction of enrichment, and a tails header from each stage is connected to the feed header of the preceding stage;

lines connecting the feed headers of all stages together; and a cascade feed line, a product line from each stage, and a tails line from each stage having choke valves located therein.

8. The apparatus of claim 7 wherein a common ring line connects the feed headers of each stage, whereby the pressure in the feed header of each stage is equalized.

* * * * *